(12) United States Patent  
Sumi et al.

(10) Patent No.: US 8,005,334 B2
(45) Date of Patent: Aug. 23, 2011

(54) OPTICAL MODULE

(75) Inventors: Toshiharu Sumi, Kawaguchi (JP); Shimpei Morioka, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 12/586,602

(22) Filed: Sep. 24, 2009

(65) Prior Publication Data

US 2010/0080526 A1 Apr. 1, 2010

(30) Foreign Application Priority Data

Oct. 1, 2008 (JP) .................................. 2008-256264

(51) Int. Cl.
*G02B 6/00* (2006.01)
*G02B 6/10* (2006.01)

(52) U.S. Cl. ........................................ 385/135; 385/147
(58) Field of Classification Search .......... 385/135–139, 385/147
See application file for complete search history.

(56) References Cited

U.S. PATENT DOCUMENTS

| 6,776,534 B2 * | 8/2004 | Takahashi et al. ............. 385/76 |
| 7,637,673 B2 * | 12/2009 | Oike et al. ........................ 385/98 |
| 2005/0074219 A1 * | 4/2005 | Dela Rosa et al. ............. 385/135 |
| 2006/0215963 A1 * | 9/2006 | Hamano ......................... 385/49 |

FOREIGN PATENT DOCUMENTS

JP 2006-184338 7/2006

* cited by examiner

*Primary Examiner* — Akm E Ullah
(74) *Attorney, Agent, or Firm* — DLA Piper LLP (US)

(57) ABSTRACT

An optical module including a cylindrical holder in an optical receptacle for optically connecting an optical fiber and an optical device, a ferrule that holds a tip end section of the optical fiber; and a holder that holds a base end section of the ferrule. The tip end section of the optical fiber and the ferrule are inserted into the cylindrical holder and held there within and a ring shaped spacer is provided that fills a gap between the cylindrical holder and the holder in a state in which the tip end section of the optical fiber and the ferrule are inserted into the cylindrical holder.

2 Claims, 6 Drawing Sheets

OPTICAL MODULE

BACKGROUND OF THE INVENTION

1. Field of the Invention

The present invention relates to an optical fiber holding structure. In particular, the present invention relates to an optical fiber holding structure suitable for holding optical fiber.

2. Description of the Related Art

Conventionally, an optical module component referred to as an optical receptacle has been used in optical communication using optical fiber.

FIG. 11 is a diagram of a conventionally used optical receptacle 1 such as this. The optical receptacle 1 has a roughly cylindrical holder section 2 in a right end section in FIG. 11.

A ring-shaped flange section 3 is provided around the holder section 2, near a left end section in FIG. 11.

A ring-shaped ferrule contacting section 5 is formed on an inner circumferential surface of the holder section 2 in the left end section in FIG. 11. The ferrule contacting section 5 extends in an inward radial direction (towards the center of the holder section 2). A right end surface 5a of the ferrule contacting section 5 in FIG. 11 is a contacting surface 5a that comes into contact with a ferrule, described hereafter.

A thick, disk-shaped lens section 7 is provided on the left end of the holder section 2 in FIG. 11, such as to be connected to the holder section 2. In the lens section 7, the right end surface in FIG. 11 is a flat optical surface 7a, and the left end surface in FIG. 11 is a convex surface 7b.

A cylindrical optical device attaching section 8 is provided such as to be connected to the lens section 7. The optical device attaching section 8 extends towards a side opposite to the holder section 2. An optical device, such as a semiconductor laser, can be attached to a left end surface side of the optical device attaching section 8 in FIG. 11 by an attaching method such as adhesion.

In the optical receptacle 1 such as this, as shown in FIG. 12, a portion of optical fiber 10 that is a predetermined area on the tip side (referred to, hereinafter, as a tip end section) is inserted into the holder section 2 with a cylindrical ferrule 11 that holds the tip end section of the optical fiber 10, and is held therewithin.

In an inserted state in which the ferrule 11 is fully inserted into the holder section 2, an end surface on the optical receptacle 1 side of the ferrule 11 in FIG. 12 that is the tip end surface (left end surface in FIG. 12) comes into contact with the contacting surface 5a of the ferrule contacting section 5 of the holder section 2.

A cylindrical metal holding member 12 that holds the ferrule 11 is provided around a base end section of the ferrule 11 (end section on the side opposite to the optical receptacle 1). The holding member 12 is held within a connector casing 14 (an LC connector casing in FIG. 12).

An optical connector for connecting the optical fiber 10 to the optical receptacle 1 is configured by the ferrule 11, the holding member 12, and the connector casing 14.

In an optical connector such as this, in a state in which the tip end section of the optical fiber 10 and the ferrule 11 are inserted into the holder section 2, the tip end section of the connector casing 14 is fitted onto the outer circumferential surface of the holder section 2 such as to allow play. The connector casing 14 is then fixed to the optical receptacle 1 by a fixing means (not shown) that is a push-pull mechanism.

In this way, conventionally, the tip end section of the optical fiber 10 and the ferrule 11 are inserted into the holder section 2 of the optical receptacle 1 and held therewithin.

In a state in which the tip end section of the optical fiber 10 and the ferrule 11 are held within the holder section 2 in this way and the optical device is attached to the optical device attaching section 8, the optical receptacle 1 optically couples the optical device and the optical fiber 10 via the lens section 7.

In addition, this type of optical module in which an optical device is attached to the optical receptacle 1 has been required to have a favorable wiggle characteristic, since the past.

Here, the wiggle characteristic refers to a load characteristic of optical coupling efficiency. In a state in which the tip end section of the optical fiber and the ferrule are inserted into the optical receptacle (holder section) and the optical device is attached to the optical receptacle, when a load (referred to, hereinafter, as lateral load) is applied to the optical connector in a direction perpendicular to the optical axis of the tip end section of the optical fiber, the load characteristic of optical coupling efficiency indicates a change in coupling efficiency between the optical device and the optical fiber depending on a change in lateral load.

A favorable wiggle characteristic indicates that deterioration of coupling efficiency is small, regardless of increase in lateral load.

Patent Literature 1: Japanese Patent Laid-open Publication No. 2006-189338

However, as shown in FIG. 12, conventionally, in a state in which the tip end section of the optical fiber 10 and the ferrule 11 are inserted into the holder section 2, a gap d is formed between the holder section 2 and the holding member 12 along a longitudinal direction of the ferrule 11 (or in other words, an optical axis OA direction of the tip end section of the optical fiber 10). As a result of the gap d, the ferrule 11 and the tip end section of the optical fiber 10 are easily deformed in a direction perpendicular to the optical axis OA of the tip end section of the optical fiber 10.

Therefore, form-stability of the optical fiber 10 against lateral load cannot be maintained. As a result, a problem occurs in that the wiggle characteristic deteriorates.

SUMMARY OF THE INVENTION

Therefore, the present invention has been achieved in light of the above-described issues. An object of the present invention is to provide an optical fiber holding structure that can enhance wiggle characteristic.

In order to achieve the aforementioned object, an optical fiber holding structure according to a first aspect of the present invention includes a cylindrical holder in an optical receptacle for optically coupling optical fiber and an optical device. The optical fiber holding structure also includes a ferrule that holds a tip end section of the optical fiber, and a holding member that holds a base end section of the ferrule. In the optical fiber holding structure, the tip end section of the optical fiber and the ferrule are inserted into the holder and held therewithin. A spacer is provided that fills a gap between the holder and the holding member in a state in which the tip end section of the optical fiber and the ferrule are inserted into the holder.

In the invention according to the first aspect, because the spacer fills the gap between the holder and the holding member, form-stability of the optical fiber against lateral load can be improved, and wiggle characteristic can be enhanced.

An optical fiber holding structure according to a second aspect is the optical fiber holding structure according to the first aspect, in which the spacer is configured by a ring-shaped body that can be mounted on and removed from an outer circumference of the ferrule.

In the invention according to the second aspect, the spacer can be simply formed by a ring-shaped body separate from the holder. Therefore, manufacturing cost and replacement cost of the spacer can be reduced.

In addition, an optical fiber holding structure according to a third aspect is the optical fiber holding structure according to the first aspect, in which the spacer is configured by a ring-shaped section integrally formed with the holder on a tip end surface of the holder facing the holding member.

In the invention according to the third aspect, the spacer can be simply formed by a ring-shaped section integrally formed with the holder. Therefore, the number of components can be reduced and manufacturing cost of the spacer can be reduced. In addition, the optical receptacle and the optical connector can be easily connected.

In addition, an optical fiber holding structure according to a fourth aspect is the optical fiber holding structure according to the first aspect, including a connector casing that holds the holding member. The spacer is configured by a ring-shaped body that can be mounted on and removed from an outer circumference of the ferrule, and a portion of the connector casing sandwiched between the ring-shaped body and the holding member in a state in which the tip end section of the optical fiber and the ferrule are inserted into the holder and the ring-shaped body is mounted on the ferrule.

In the invention according to the fourth aspect, the spacer can be simply configured by a ring-shaped body separate from the holder and a portion of the connector casing. Therefore, manufacturing cost and replacement cost of the spacer can be reduced.

In addition, an optical fiber holding structure according to a fifth aspect is the optical fiber holding structure according to the first aspect, including a connector casing that holds the holding member. The spacer is configured by a ring-shaped section integrally formed with the holder on a tip end surface of the holder facing the holding member, and a portion of the connector casing sandwiched between the ring-shaped section and the holding member in a state in which the tip end section of the optical fiber and the ferrule are inserted into the holder.

In the invention according to the fifth embodiment, the spacer can be simply formed by a ring-shaped section integrated with the holder and a portion of the connector casing. Therefore, manufacturing cost of the spacer can be reduced, and the optical receptacle and the optical connector can be easily connected.

EFFECT OF THE INVENTION

In the optical fiber holding structure of the present invention, the wiggle characteristic can be enhanced, allowing stable optical communication using optical fiber to be actualized.

DETAILED DESCRIPTION OF THE PREFERRED EMBODIMENT

First Embodiment

An optical fiber holding structure according to a first embodiment of the present invention will be described with reference to FIG. 1 to FIG. 4.

Sections having the same or similar basic configuration as that of the conventional technology are explained using the same reference numbers.

Figure 1:
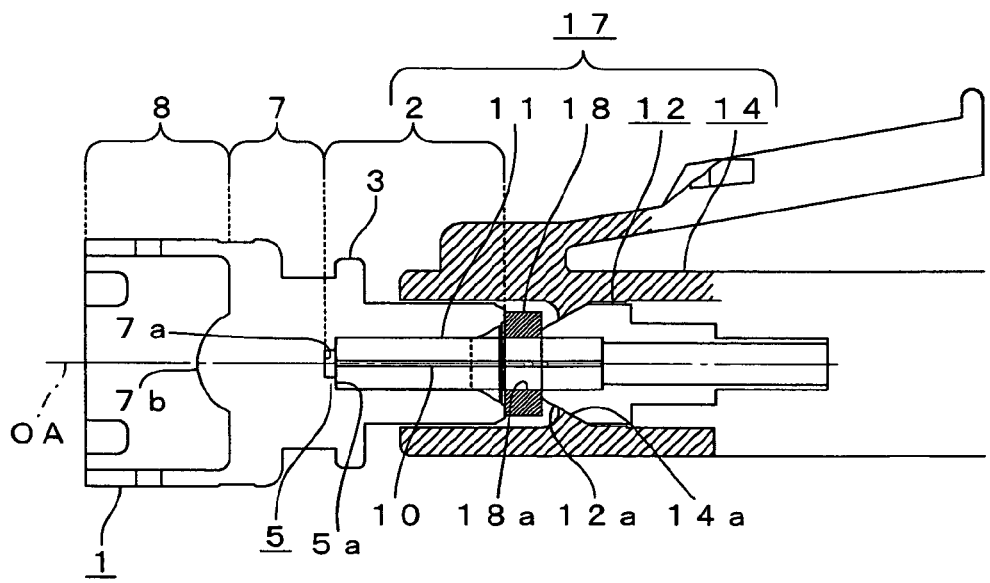
FIG. 1 is a configuration diagram of an optical fiber holding structure according to a first embodiment of the present invention.

FIG. 1 is a diagram of an optical fiber holding structure 17 according to the first embodiment.

Figure 11:
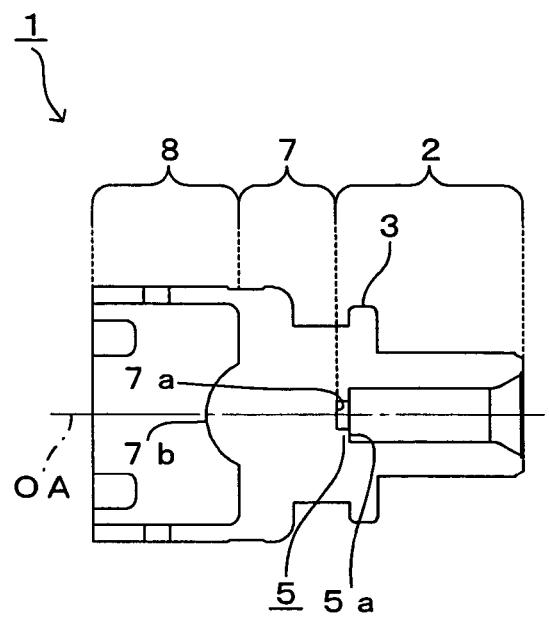
FIG. 11 is a configuration diagram of a conventionally used optical receptacle.

The optical fiber holding structure 17 includes a cylindrical (roughly cylindrical) holder section 2 serving as a holder in an optical receptacle 1 shown in FIG. 11, a cylindrical ferrule 11 that holds a tip end section of optical fiber 10, a holding member 12 that holds a base end section (right end section in FIG. 1) of the ferrule 11, and a connector casing 14 that holds the holding member 12.

According to the embodiment, the holding member 12 is held within the connector casing 14 such that a tapered surface 12a formed at a tip end section of the holding member 12 is crimped to a projecting section 14a provided such as to project from an inner circumferential surface of the connector casing 14. The holding member 12 and the connector casing 14 such as these, and the ferrule 11 configure an LC connector serving as an optical connector. The LC connector is a compact, push-pull type connector capable of high-density mounting. The LC connector is suitable for use in, for example, in-house wiring and switching equipment. A ferrule diameter of the LC connector is half of that of an SC connector, described hereafter.

The optical receptacle 1 is integrally formed by injection-molding and the like using resin material.

Figure 12:
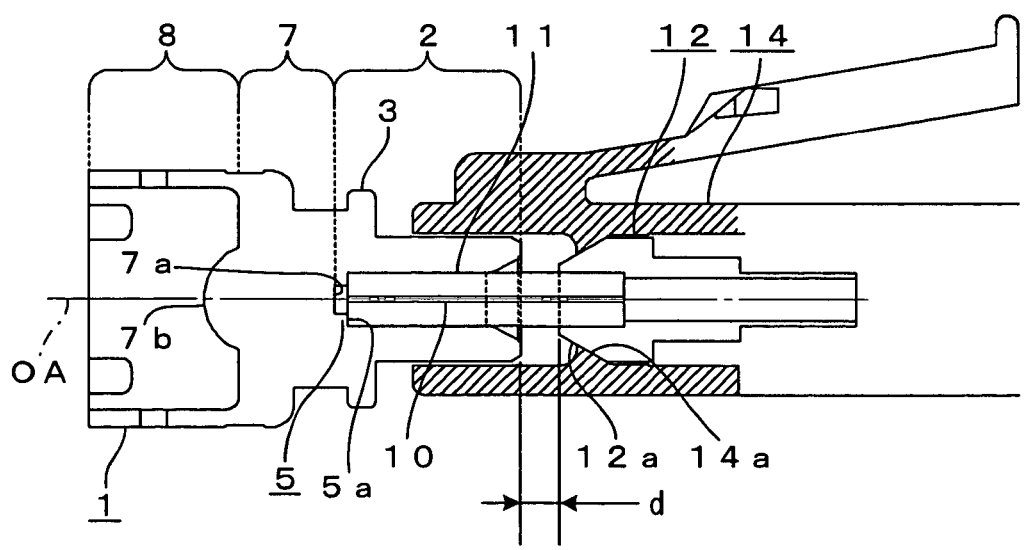
FIG. 12 is a configuration diagram of a conventional fiber holding structure.

In a manner similar to the configuration shown in FIG. 12, in the optical fiber holding structure 17, the tip end section of the optical fiber 10 is inserted into the holder section 2 with the ferrule 11. A tip end surface of the ferrule 11 comes into contact with a contacting surface 5a of a ferrule contacting section 5 in the holder section 2. The connector casing 19 is fitted onto the outer circumference of the holder section 2 such as to allow play. The optical fiber 10 is thus held at a position allowing optical coupling with an optical device.

However, according to the embodiment, unlike the conventional configuration, a means for enhancing wiggle characteristic is provided.

In other words, the optical fiber holding structure 17 according to the embodiment includes a spacer that fills a gap between the holder section 2 and the holding member 12 in a state in which the tip end section of the optical fiber 10 and the ferrule 11 are inserted into the holder section 2 (referred to, hereinafter, as a fiber-inserted state).

More specifically, as shown in FIG. 1, the spacer according to the embodiment is a circular ring-shaped body 18.

In other words, a circular through-hole 18a having an inner diameter that is slightly larger than an outer diameter of the ferrule 11 is formed in the ring-shaped body 18. The ring-shaped body 18 is mounted on and removed from the outer circumference of the ferrule 11 via the through-hole 18a.

As shown in FIG. 1, in a state in which the ring-shaped body 18 is mounted on the ferrule 11 in the fiber-inserted state, the ring-shaped body 18 is sandwiched between the tip end surface of the holder section 2 facing the holding member 12 (right end surface in FIG. 1) and the tip end surface of the holding member 12 facing the holder section 2 (left end surface in FIG. 1). As a result, the ring-shaped body 18 fills a space referred to as gap d in FIG. 12.

As a result, form-stability of the optical fiber 10 against lateral load can be improved, and the wiggle characteristic can be enhanced.

In addition, as a result of the spacer being formed by a simply configured ring-shaped body 18 that is separate from the holder section 2, manufacturing cost and replacement cost of the spacer can be reduced.

The ring-shaped body 18 can be formed using a metal material, such as aluminum, brass, titanium, or phosphor bronze, or a resin material, such as polyoxymethylene (POM), polyamide (PA), polycarbonate (PC), polybutylene terephthalate (PBT), or polyether imide (PEI).

First Variation Example of First Embodiment

Figure 2:
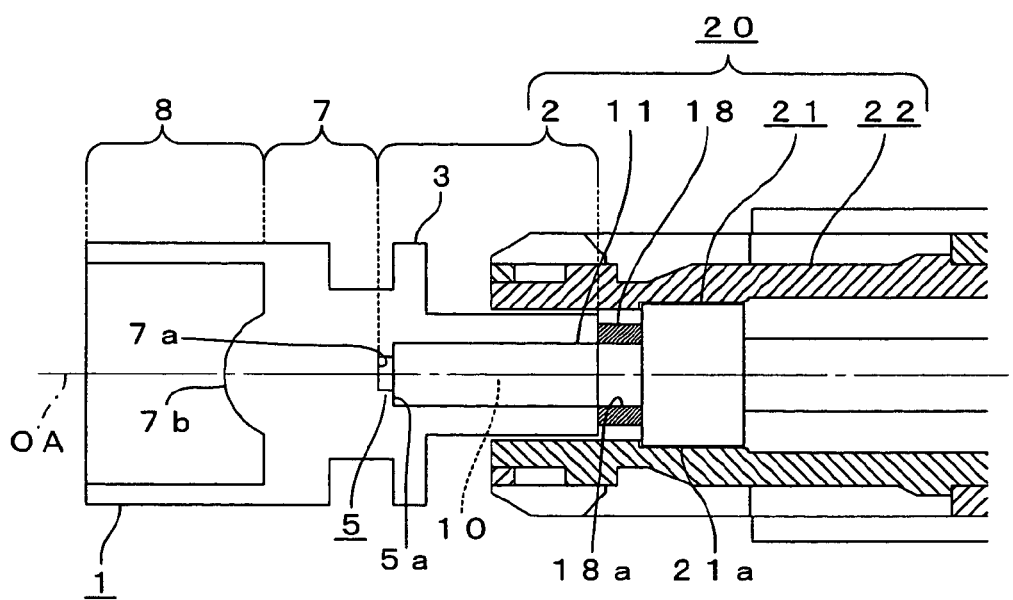
FIG. 2 is a configuration diagram of a first variation example of the optical fiber holding structure according to the first embodiment of the present invention.

Next, FIG. 2 is a diagram of a first variation example of the first embodiment. An optical fiber holding structure 20 of the first variation example has a configuration similar to that shown in FIG. 1 in that a spacer is formed by the ring-shaped body 18 that can be mounted on and removed from the outer circumference of the ferrule 11.

However, in the first variation example, the configuration of the optical connector differs from that in the optical fiber holding structure 17 shown in FIG. 1.

In other words, according to the embodiment, a holding member 21 is held within a connector casing 22 such that a cylindrical outer circumferential surface 21a formed on a leading end of the holding member 21 is crimped to an inner circumferential surface of the connector casing 22. The holding member 21 and the connector casing 22 such as these, and the ferrule 11 configure an MU connector serving as the optical connector. Like the LC connector, the MU connector is a compact, push-pull type connector capable of high-density mounting. The MU connector is suitable for use in inter-network devices, optical repeaters, and the like. A ferrule diameter of the MU connector is also half of that of the SC connector, described hereafter.

Even in the first variation example such as this, the ring-shaped body 18 can fill the gap between the holder section 2 and the holder member 21 in the fiber-inserted state. Therefore, the wiggle characteristic can be enhanced, and manufacturing cost and replacement cost of the spacer can be reduced.

Second Variation Example of First Embodiment

Figure 3:
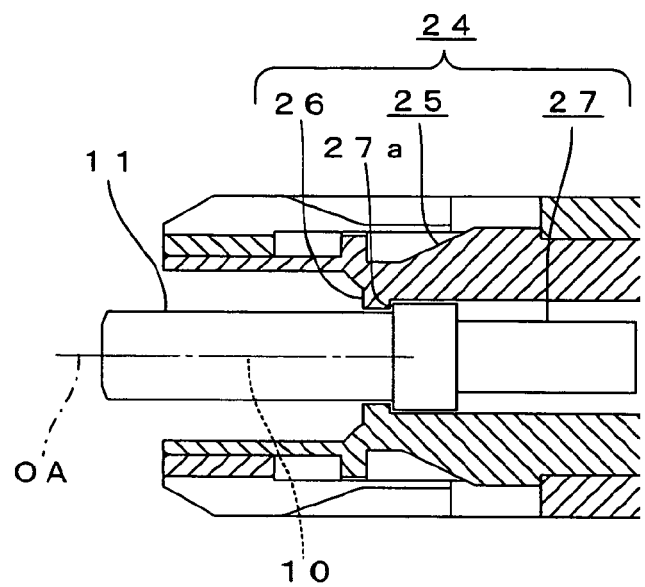
FIG. 3 is a partial configuration diagram of a second variation example of the optical fiber holding structure according to the first embodiment of the present invention.
Figure 4:
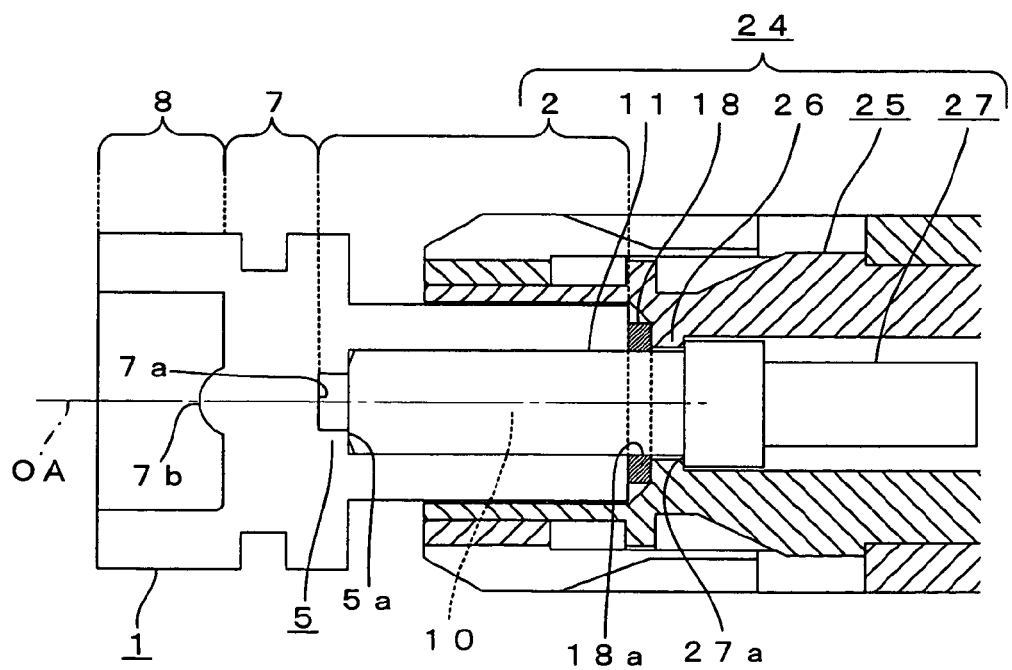
FIG. 4 is a configuration diagram of a second variation example of the optical fiber holding structure according to the first embodiment of the present invention.

Next, FIG. 3 and FIG. 4 are diagrams of a second variation example of the first embodiment. An optical fiber holding structure 24 of the second variation example has a configuration similar to that shown in FIG. 1 in that the ring-shaped body 18 that can be mounted on and removed from the outer circumference of the ferrule 11 is provided as a spacer.

However, in the second variation example, the configuration of the spacer and the configuration of the optical connector differ from those in the optical fiber holding structure 17 shown in FIG. 1.

In other words, as shown in FIG. 3, in the second variation example, a circular ring-shaped casing ring-shaped area 26 is formed on an inner circumferential surface of a connector casing 25 as a portion of the connector casing 25. The casing ring-shaped area 26 extends in an inward axial direction of the inner circumferential surface of the connector casing 25. An inner diameter of the casing ring-shaped area 26 is smaller than an outer diameter of a tip end section of a holding member 27 and is slightly larger than an outer diameter of the ferrule 11.

The casing ring-shaped area 26 such as this and the ring-shaped body 18 configure the spacer.

In other words, as shown in FIG. 4, the casing ring-shaped area 26 is sandwiched between the ring-shaped body 18 and a tip end surface 27a of the holding member 27 in a state in which the ring-shaped body 18 is mounted on the ferrule 11 in the fiber-inserted state. As a result, the casing ring-shaped area 26 and the ring-shaped body 18 fill the gap between the holder section 2 and the holding member 27 in the fiber-inserted state.

According to the embodiment, the ferrule 11, the holding member 27, and the connector casing 25 configure the SC connector serving as the optical connector. The SC connector is currently the most popular push-pull connector and is a universal standard for local-area networks (LAN). The SC connector is suitable for use in LANs, cable television (CATV), public communication channels, and the like.

Even in the second variation example such as this, the ring-shaped body 18 and the casing ring-shaped area 26 can fill the gap between the holder section 2 and the holding member 27 in the fiber-inserted state. Therefore, the wiggle characteristic can be enhanced, and manufacturing cost and replacement cost of the spacer can be reduced.

Second Embodiment

Next, an optical fiber holding structure according to a second embodiment of the present invention will be described with reference to FIG. 5 to FIG. 10.

Sections having the same or similar basic configuration as that according to the first embodiment are explained using the same reference numbers.

Figure 5:
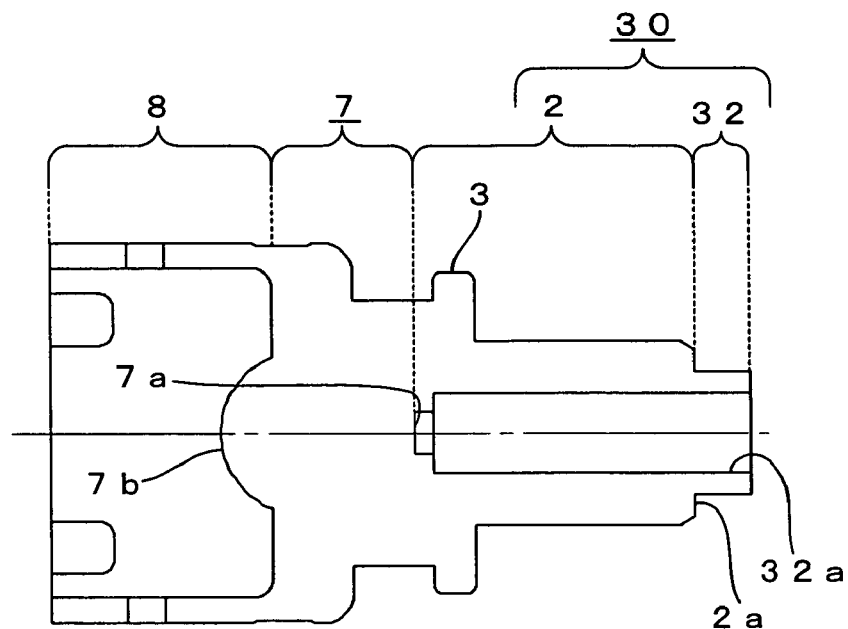
FIG. 5 is a partial configuration diagram of an optical fiber holding structure according to a second embodiment of the present invention.
Figure 6:
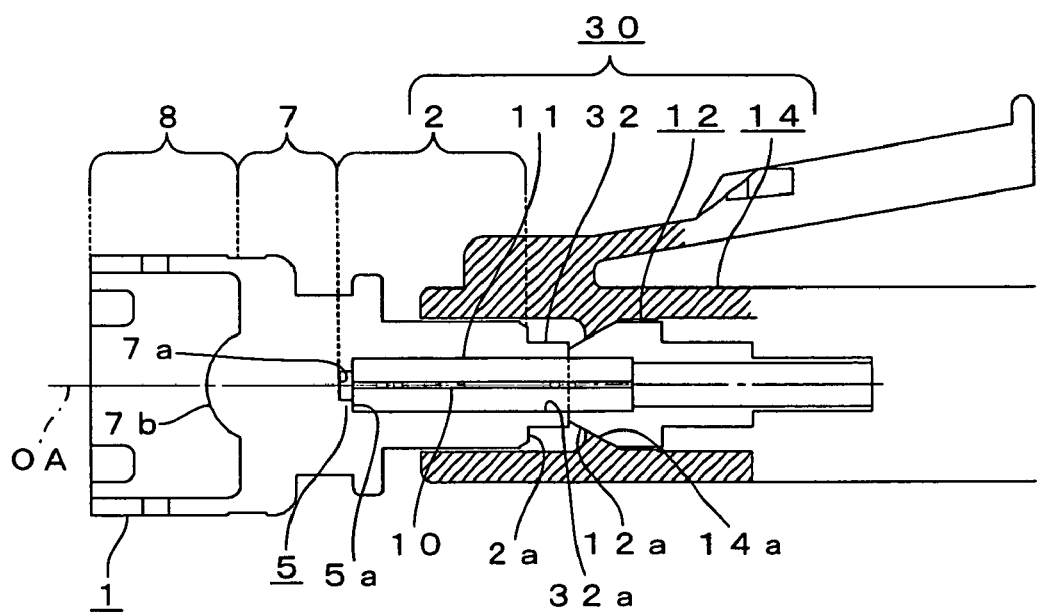
FIG. 6 is a configuration diagram of the optical fiber holding structure according to the second embodiment of the present invention.

FIG. 5 and FIG. 6 are diagrams of an optical fiber holding structure 30 according to the second embodiment. In a manner similar to the optical fiber holding structure 17 according to the first embodiment shown in FIG. 1, the optical fiber holding structure 30 includes the holder section 2, the ferrule 11, the holding member 12, the connector casing 14, and the spacer.

In addition, like the optical fiber holding structure 17 shown in FIG. 1, the optical fiber holding structure 30 according to the second embodiment is applied to an LC connector.

However, the configuration of the spacer in the optical fiber holding structure 30 differs from that of the optical fiber holding structure 17 shown in FIG. 1.

In other words, as shown in FIG. 5, according to the second embodiment, the spacer is a circular ring-shaped section 32 formed integrally with the holder section 2 on the tip end surface 2a of the holder section 2 facing the holding member 12.

In the ring-shaped section 32, a circular through-hole 32a having the same inner diameter as the inner diameter of the holder section 2 is formed concentrically with the inner circumferential surface of the holder section 2. The ferrule 11 can be inserted into the holder section 2 through the through-hole 32a.

Then, as shown in FIG. 6, the ring-shaped section 32 comes into contact with the tip end surface (left end surface in FIG. 6) of the holding member 12 facing the holder section 2 and the ring-shaped section 32 in the fiber-inserted state. As a result, the space referred to as gap d in FIG. 12 can be filled.

Therefore, according to the second embodiment as well, the gap between the holder section 2 and the holding member 12 in the fiber-inserted state can be filled by the spacer in the same manner as that according to the first embodiment. Therefore, form-stability of the optical fiber 10 against lateral load can be improved, and the wiggle characteristic can be enhanced.

In addition, as a result of the spacer being formed by the simply configured ring-shaped section 32, manufacturing cost of the spacer can be reduced. According to the second embodiment, because the ring-shaped section 32 integrated with the holder section 2 is used as the spacer, the number of components can be reduced. In addition, because a procedure for setting the spacer is not required when connecting the optical receptacle and the optical connector, the optical receptacle and the optical connector can be easily connected.

In terms of cost reduction, the ring-shaped member 32 is preferably formed using the same material as that of the optical receptacle 1.

First Variation Example of Second Embodiment

Figure 7:
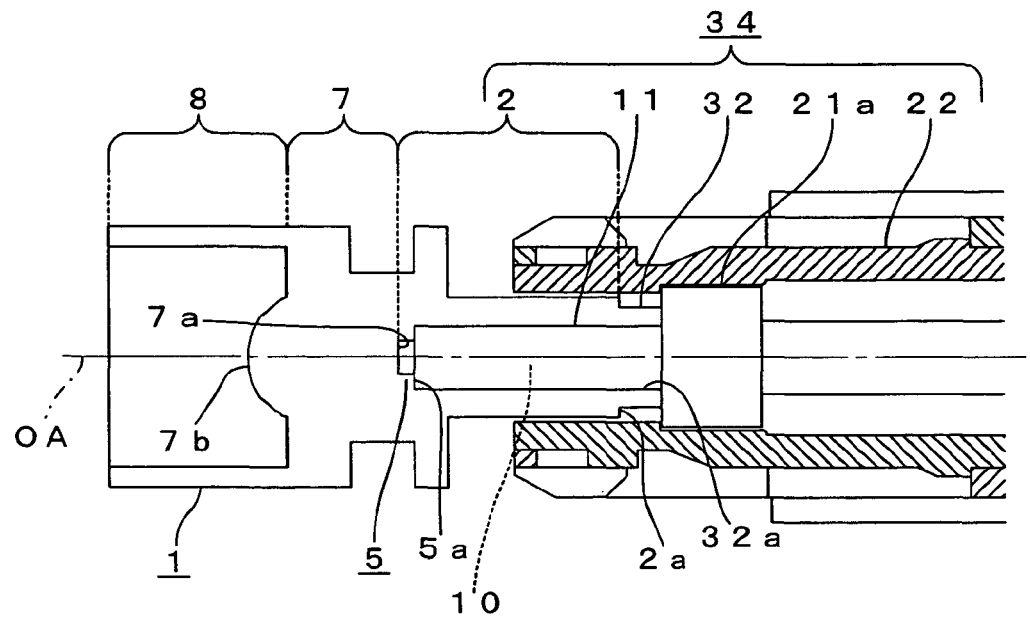
FIG. 7 is a configuration diagram of a first variation example of the optical fiber holding structure according to the second embodiment of the present invention.

Next, FIG. 7 is a first variation example of the second embodiment. An optical fiber holding structure 34 of the first variation example differs from the optical fiber holding structure 30 shown in FIG. 5 and FIG. 6 in that the optical fiber holding structure 34 is applied to the MU connector shown in FIG. 2. The configuration of the spacer is the same as that of the optical fiber holding structure 30 shown in FIG. 5 and FIG. 6.

Therefore, even in the first variation example, the spacer configured by the ring-shaped section 32 can fill the gap between the holder section 2 and the holding member 21 in the fiber inserted state. Therefore, form-stability of the optical fiber 10 against lateral load can be improved, and the wiggle characteristic can be enhanced. In addition, manufacturing cost of the spacer can be reduced, and smooth connection between the optical receptacle and the optical connector can be achieved.

Second Variation Example of Second Embodiment

Figure 8:
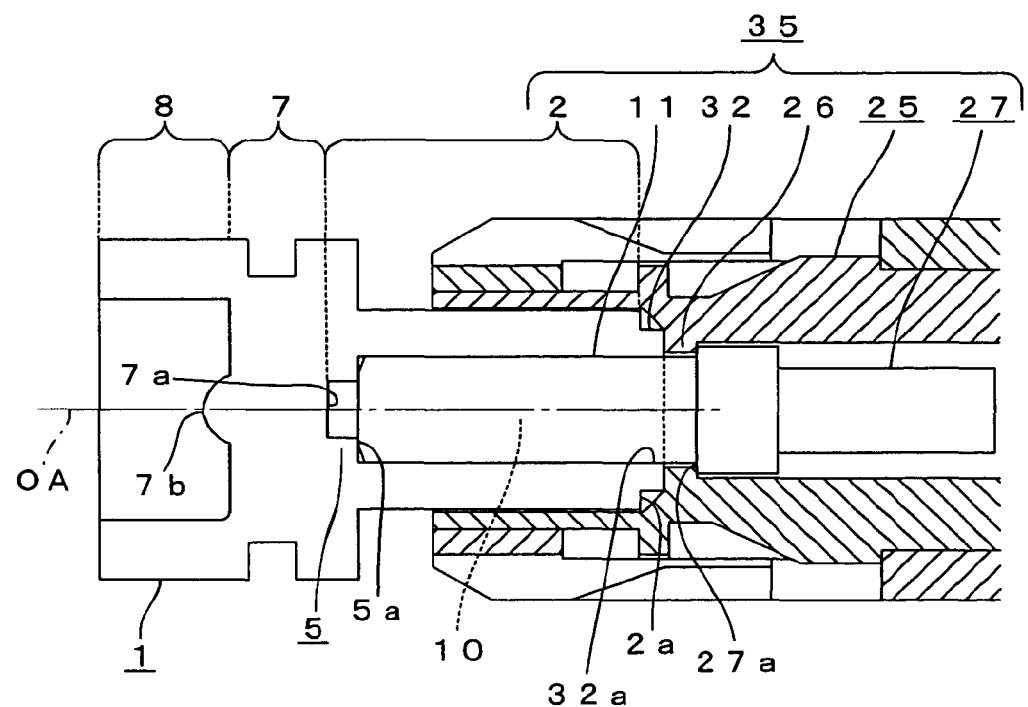
FIG. 8 is a configuration diagram of a second variation example of the optical fiber holding structure according to the second embodiment of the present invention.

Next, FIG. 8 is a diagram of a second variation example of the second embodiment. An optical fiber holding structure 35 of the second variation example has a configuration similar to that shown in FIG. 5 and FIG. 6 in that the ring-shaped section 32 formed integrally with the holder section 2 is provided as the spacer.

However, the optical fiber holding structure 35 according to the second variation example is applied to the SC connector shown in FIG. 3. The spacer is configured by the casing ring-shaped area 26 formed in the connector casing 25 of the SC connector and the ring-shaped section 32.

In other words, as shown in FIG. 8, the ring-shaped section 32 comes into contact with the casing ring-shaped area 26 in the fiber-inserted state. As a result, the ring-shaped section 32 and the casing ring-shaped area 26 fill the gap between the holder section 2 and the holder member 27 in the fiber-inserted state.

As a result, even in the second variation example, form-stability of the optical fiber 10 against lateral load can be improved, and the wiggle characteristic can be enhanced. In addition, manufacturing cost of the spacer can be reduced, and smooth connection between the optical receptacle and the optical connector can be achieved.

EXAMPLES

As an example of the present invention, test results of a wiggle characteristic test conducted on the optical receptacle 1 will be described.

Figure 9:
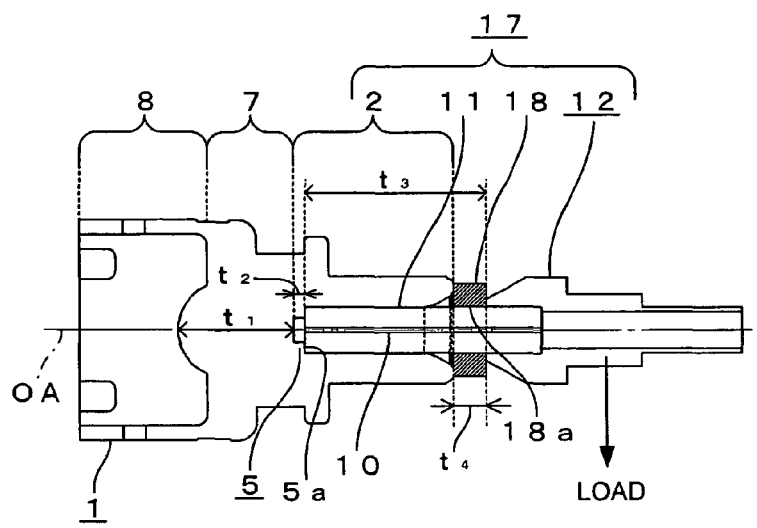
FIG. 9 is a configuration diagram of an example of an optical fiber holding structure of the present invention.

In the wiggle characteristic test, as shown in FIG. 9, a following experimental system was prepared. A semiconductor laser (not shown) is attached to the optical device attaching section 8 as an optical device. The ferrule 11 holding the tip end section of the optical fiber 10 is held by the holding member 12. The ring-shaped body 18 is mounted on the ferrule 11. In this state, the ferrule 11 is inserted into the holder section 2. The tip end surface of the ferrule 11 comes into contact with the contacting surface 5a within the holder section 2. As a result, the ring-shaped body 18 is sandwiched between the holder section 2 and the holding member 12.

In the test, the connector casing 14 is not provided, and the holding member 12 is in an exposed state. In addition, the optical receptacle 1 is integrally formed using polyether imide. As shown in FIG. 9, in the test, a thickness t1 of the lens section 7 is 3 millimeters. A thickness t2 of the ferrule contacting section 5 is 0.3 millimeters. A distance t3 in the optical axis OA direction from the contact surface 5a to the tip end surface of the holding member 12 in the fiber-inserted state is 4.93 millimeters. A distance from the tip end surface of the holder section 2 to the tip end surface of the holding member 12 in the fiber-inserted state or, in other words, a thickness t4 of the ring-shaped body 18 is 0.89 millimeters. In addition, in the test, the optical receptacle 1 is disposed horizontally, such that a longitudinal direction of the ferrule 11, namely the optical axis OA direction of the tip end section of the optical fiber 10, is in a horizontal state.

In the experimental system such as this, the load characteristic regarding optical coupling efficiency between the semiconductor laser and the optical fiber 10, namely the wiggle characteristic, was examined by a downward vertical load (N) (lateral load) being applied to the holding member 12 as shown in FIG. 9.

As a comparison example, an experimental system equivalent to a convention fiber holding structure was prepared that is the experimental system shown in FIG. 9 from which only the ring-shaped body 18 has been eliminated. The wiggle characteristic of the optical receptacle 1 was examined for the comparison example as well, in a manner similar to that in FIG. 9.

Figure 10:
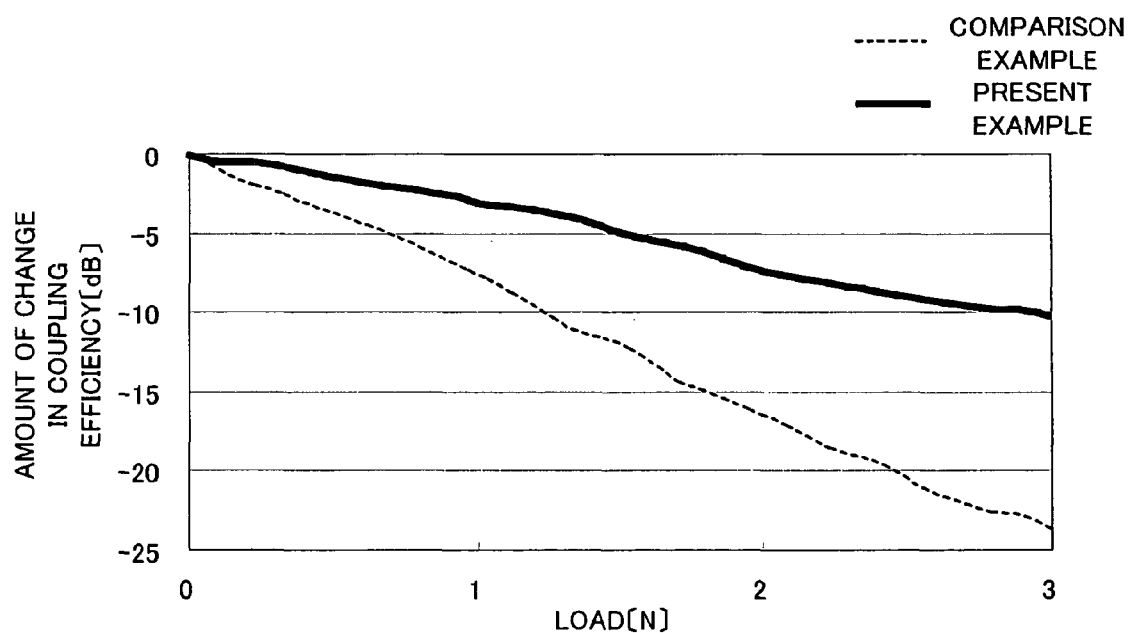
FIG. 10 is a graph of the example of the optical fiber holding structure of the present invention.

As a result, test results shown in FIG. 10 were obtained.

As shown in FIG. 10, it is clear that stability of optical coupling efficiency [dB] in relation to increase in load of the present example is superior to that of the comparison example. A reason for this is presumed to be improved form-stability of the optical fiber 10 held by the ferrule 11 as a result of the outer circumferential surface of the ferrule 11 being reinforced by the ring-shaped body 18.

As described above, in the present invention, form-stability of the optical fiber 10 against lateral load can be improved by the spacer. Therefore, the wiggle characteristic can be enhanced by a simple configuration. In addition, stable optical communication can be ensured, and costs can be reduced.

The present invention is not limited to the above-described embodiments. Various modifications can be made as required.

What is claimed is:

1. An optical fiber holding structure, comprising:
   a cylindrical holder in an optical receptacle for optically coupling optical fiber and an optical device;
   a ferrule that holds a tip end section of the optical fiber;
   a holding member that holds a base end section of the ferrule; and
   a connector casing that holds the holding member, wherein
   the tip end section of the optical fiber and the ferrule are inserted into the holder and held therewithin;
   a spacer is provided that fills a gap between the holder and the holding member in a state in which the tip end section of the optical fiber and the ferrule are inserted into the holder; and
   the spacer is configured by
      a ring-shaped body that can be mounted on and removed from an outer circumference of the ferrule, and
      a portion of the connector casing sandwiched between the ring-shaped body and the holding member in a state in which the tip end section of the optical fiber and the ferrule are inserted into the holder and the ring-shaped body is mounted on the ferrule.

2. An optical fiber holding structure, comprising:
   a cylindrical holder in an optical receptacle for optically coupling optical fiber and an optical device;
   a ferrule that holds a tip end section of the optical fiber;
   a holding member that holds a base end section of the ferrule; and
   a connector casing that holds the holding member, wherein
   the tip end section of the optical fiber and the ferrule are inserted into the holder and held therewithin;
   a spacer is provided that fills a gap between the holder and the holding member in a state in which the tip end section of the optical fiber and the ferrule are inserted into the holder; and
   the spacer is configured by
      a ring-shaped section integrally formed with the holder on a tip end surface of the holder facing the holding member, and
      a portion of the connector casing sandwiched between the ring-shaped section and the holding member in a state in which the tip end section of the optical fiber and the ferrule are inserted into the holder.

* * * * *